United States Patent
Scoda et al.

(10) Patent No.: US 11,960,560 B1
(45) Date of Patent: Apr. 16, 2024

(54) METHODS FOR ANALYZING RECURRING ACCESSIBILITY ISSUES WITH DYNAMIC WEB SITE BEHAVIOR AND DEVICES THEREOF

(71) Applicant: UsableNet Inc., New York, NY (US)

(72) Inventors: Enrico Scoda, Martignacco (IT); Matteo Ceraico, Gorizia (IT)

(73) Assignee: USABLENET INC., New York, NY (US)

( * ) Notice: Subject to any disclaimer, the term of this patent is extended or adjusted under 35 U.S.C. 154(b) by 0 days.

(21) Appl. No.: 18/111,355

(22) Filed: Feb. 17, 2023

(51) Int. Cl.
*G06F 16/957* (2019.01)
*G06F 9/54* (2006.01)
*G06F 16/906* (2019.01)
*G06F 40/154* (2020.01)

(52) U.S. Cl.
CPC .......... *G06F 16/9574* (2019.01); *G06F 9/542* (2013.01); *G06F 16/906* (2019.01); *G06F 40/154* (2020.01)

(58) Field of Classification Search
CPC .. G06F 16/9574; G06F 16/906; G06F 40/154; G06F 9/542; G06F 16/986; G06F 16/9566; G06F 16/9577; G06F 40/117
See application file for complete search history.

(56) References Cited

U.S. PATENT DOCUMENTS

| | | | |
|---|---|---|---|
| 11,055,208 B1 * | 7/2021 | Pandurangarao | G06F 11/3692 |
| 11,507,639 B1 * | 11/2022 | Scoda | G06F 16/986 |
| 2018/0018254 A1 * | 1/2018 | Bansal | G06F 11/3604 |
| 2018/0227128 A1 * | 8/2018 | Church | H04L 9/3247 |
| 2019/0235998 A1 * | 8/2019 | Fisher | G06F 11/3688 |
| 2019/0340212 A1 * | 11/2019 | Isager | G06F 16/972 |
| 2020/0081927 A1 * | 3/2020 | Sabbavarpu | G06F 11/3086 |
| 2020/0150832 A1 * | 5/2020 | Winn | A61K 39/39566 |
| 2020/0322414 A1 * | 10/2020 | Ashraf | H04L 63/1416 |
| 2021/0049234 A1 * | 2/2021 | Kumar | G06F 40/117 |
| 2022/0121723 A1 * | 4/2022 | Page | G06F 11/0784 |
| 2023/0393928 A1 * | 12/2023 | Mehta | H04L 67/133 |

\* cited by examiner

*Primary Examiner* — Scott T Baderman
*Assistant Examiner* — Mario M Velez-Lopez
(74) *Attorney, Agent, or Firm* — Troutman Pepper Hamilton Sanders LLP (Rochester)

(57) ABSTRACT

Methods, non-transitory computer readable media, and accessibility analysis devices are disclosed that generate an event listener hash value for event listeners identified in a web page runtime environment. The event listener hash values are generated from event listener data extracted from web page source code. A subset of the event listeners are determined to be irrelevant to an accessibility review based on a classification identified based on a comparison of the event listener hash values to stored event listener hash values. An element hash value is generated for elements of the web page associated with accessibility issue and another subset of the event listeners determined to be relevant to the accessibility review. An issue report is output to a client device that includes a review for each of a subset of the accessibility issues retrieved based on a comparison of the generated element hash values to stored element hash values.

18 Claims, 8 Drawing Sheets

FIG. 5

```
{
    type: "change",
    listener: "function(e){return void 0!==g&&g.event.triggered!==e.type?g.event.dispatch.apply(t, arguments):void 0}",
    args: {
        useCapture: false,
        passive: false,
        once: false
    },
    script: "<script type=\"text/javascript\" src=\"https://usablenet.com/all.js\"></script>",
    stackTrace: "
        at Object.add (https://usablenet.com/all.js:1:40351)
        at HTMLDocument.<anonymous> (https://usablenet.com/all.js:1:39553)
        at Function.each (https://usablenet.com/all.js:1:2847)
        at g.fn.init.each (https://usablenet.com/all.js:1:1155)
        at m0 (https://usablenet.com/all.js:1:39529)
        at g.fn.init.on (https://usablenet.com/all.js:1:45365)
        at https://usablenet.com/all.js:1:364146",
    context: "document", ← 602
    ext: {
        events: {
            change: [{
                handler: "function(){toggleResources()}}",
                selector: ".content-type input"
            }]
        }
    }
}
```

```
mousemove|false|false|false|at HTMLElement.<anonymous> (https://www.moncler.com/on/demandware.static/Sites-MonclerUS-Site/-/default/
v16663415l2883/js/main.js:1:637005) at HTMLElement.addEventListener (https://www.moncler.com/on/demandware.static/Sites-MonclerUS-
Site/-/default/v16663415l2883/js/main.js:1:608589) at https://www.moncler.com/on/demandware.static/Sites-MonclerUS-Site/-/default/
v16663415l2883/js/component-productCarouselComponent.chunk.js:1:1141 at Array.forEach (<anonymous>) at https://www.moncler.com/on/
demandware.static/Sites-MonclerUS-Site/-/default/v16663415l2883/js/component-productCarouselComponent.chunk.js:1:1016 at i (https://
www.moncler.com/on/demandware.static/Sites-MonclerUS-Site/-/default/v16663415l2883/js/main.js:1:634447) at func
(<anonymous>:311:1B)| ({pageX:e})=>{const s=e/t.offsetWidth*100;s<25?(t.classList.add(\"show-left-
arrow\"),t.classList.remove(\"show-right-arrow\")):s>75?(t.classList.add(\"show-right-arrow\"),t.classList.remove(\"show-left-
arrow\")):(t.classList.remove(\"show-right-arrow\"),t.classList.remove(\"show-left-arrow\"))}
```

4f4301b9fceb19f7f1fdd1cd6b59e1a6bd169872732b35d6c593c1c21f662cbcf5b8d2df9fe008c8e6001e8231f444dcece5b81893e6b89ad8c71eb0af5a0122

METHODS FOR ANALYZING RECURRING ACCESSIBILITY ISSUES WITH DYNAMIC WEB SITE BEHAVIOR AND DEVICES THEREOF

FIELD

This technology generally relates to web site accessibility evaluation and, more particularly, to methods and devices for efficient identification and evaluation of recurring accessibility issues with dynamic web site behavior.

BACKGROUND

Web site accessibility issues can be identified based on a failure to comply with one or more published guidelines relating to usability and accessibility of web pages (e.g., the Web Content Accessibility Guidelines 2.0, W3C World Wide Web Consortium Recommendation, Dec. 11, 2008). Rule sets have been developed to evaluate web pages according to such guidelines, which can be applied to web pages and associated source code to identify potential accessibility issues. However, there is a set of accessibility issues that cannot be described by rules applied to source code and web page element current state (e.g., source code structure, content, stylesheets, and layout) because the accessibility issues are strictly related to the dynamic behavior of a web page.

For example, opening a new window when clicking on a link, custom controls interoperable with both keyboard and pointer devices, and complex functionalities related to mouse movements and gestures are dynamic tasks that can only be implemented by integrating a web page with robust and relatively complex JavaScript code. This integration is often performed by implementing multiple event listeners, which are JavaScript functions that can be linked to web page elements and activated when particular events occur (e.g., a click, a mouse move, a drag, or a mouse-over).

The mechanism of event propagation through web page elements is constituted by three phases including a capture phase in which the event goes down to the target element, a target phase in which the event reaches the target element, and a bubbling phase in which the event "bubbles up" from the target element. For example, if a user clicks on a button, the event can be intercepted at the button level or at its ancestor (e.g., form element) or even at document level. Generally, generic tracking algorithms are implemented at the document level and more specific actions (e.g., opening a new window) are performed at the element level.

Modern web sites, especially those using popular JavaScript frameworks, libraries, and plugins, deliver web pages with thousands of event listeners registered at the document and element level. Thus, reviewing the dynamic source code of a web page to find potential accessibility issues can be a long and tedious process. Specifically, the process of evaluating web site accessibility issues relating to dynamic behavior is currently an inefficient task, requiring duplicative manual evaluation of equivalent web site dynamic source code and associated accessibility issues across sequential evaluations of web pages in the same web site.

SUMMARY

A method for evaluating web site accessibility is disclosed that is implemented by one or more accessibility analysis devices and includes generating an event listener hash value for each of a plurality of event listeners identified in a runtime environment for a web page in response to a request for an accessibility review of the web page. The event listener hash values are generated at least in part from event listener data extracted from source code of the web page corresponding to the identified event listeners. A subset of the plurality of event listeners are determined to be irrelevant to the accessibility review based on a classification of the subset of the plurality of event listeners. The classification is identified based on a comparison of the event listener hash values to stored event listener hash values. An element hash value is generated for each of a plurality of elements of the web page associated with another subset of the plurality of event listeners determined to be relevant to the accessibility review. Each of the plurality of elements is associated with one of a plurality of accessibility issues. An interactive issue report is generated and output to a client device for display that includes a review for each of a subset of the plurality of accessibility issues retrieved based on a comparison of the generated element hash values to stored element hash values. The retrieved reviews are correlated in the interactive issue report with the subset of the plurality of accessibility issues.

An accessibility analysis device is disclosed that includes memory including programmed instructions stored thereon and one or more processors configured to execute the stored programmed instructions to generate an event listener hash value for each of a plurality of event listeners identified in a runtime environment for a web page in response to a request for an accessibility review of the web page. The event listener hash values are generated at least in part from event listener data extracted from source code of the web page corresponding to the identified event listeners. A subset of the plurality of event listeners are determined to be irrelevant to the accessibility review based on a classification of the subset of the plurality of event listeners. The classification is identified based on a comparison of the event listener hash values to stored event listener hash values. An element hash value is generated for each of a plurality of elements of the web page associated with another subset of the plurality of event listeners determined to be relevant to the accessibility review. Each of the plurality of elements is associated with one of a plurality of accessibility issues. An interactive issue report is generated and output to a client device for display that includes a review for each of a subset of the plurality of accessibility issues retrieved based on a comparison of the generated element hash values to stored element hash values. The retrieved reviews are correlated in the interactive issue report with the subset of the plurality of accessibility issues.

A non-transitory computer readable medium having stored thereon instructions for evaluating web site accessibility is disclosed that includes executable code that, when executed by one or more processors, causes the one or more processors to generate an event listener hash value for each of a plurality of event listeners identified in a runtime environment for a web page in response to a request for an accessibility review of the web page. The event listener hash values are generated at least in part from event listener data extracted from source code of the web page corresponding to the identified event listeners. A subset of the plurality of event listeners are determined to be irrelevant to the accessibility review based on a classification of the subset of the plurality of event listeners. The classification is identified based on a comparison of the event listener hash values to stored event listener hash values. An element hash value is generated for each of a plurality of elements of the web page associated with another subset of the plurality of event listeners determined to be relevant to the accessibility review. Each of the plurality of elements is associated with one of a plurality of accessibility issues. An interactive issue report is generated and output to a client device for display that includes a review for each of a subset of the plurality of accessibility issues retrieved based on a comparison of the generated element hash values to stored element hash values. The retrieved reviews are correlated in the interactive issue report with the subset of the plurality of accessibility issues.

This technology provides a number of advantages including methods, non-transitory computer readable media, and accessibility analysis devices that advantageously store web page dynamic content accessibility issues with associated reviews to facilitate accurate and efficient identification of equivalent accessibility issues on different web pages, or web page versions, of a same web site. In particular, this technology reduces the cost of web site accessibility review by effectively "signing" reviewed accessibility issues to reuse the reviews in similar web pages or in future reviews.

A review of an accessibility issues with web page element associated with dynamic behavior is advantageously stored along with a hash value for the element, which is generated from a hash value of an event handler associated with the element, to facilitate subsequent identification and automatic retrieval of the stored review during a subsequent accessibility evaluation. Using the hash values and particular method described and illustrated in detail below, this technology facilitates accurate identification of corresponding accessibility issues and associated reviews across web pages accessibility evaluations.

As part of identifying potential accessibility issues with dynamic web page content, event listeners are advantageously filtered with this technology to ignore events that are not relevant to the accessibility review being performed, thereby further improving web page accessibility review efficiency. Accordingly, this technology more accurately and efficiently evaluates web page accessibility issues across a web site by reducing or eliminating review of irrelevant dynamic events and duplicative evaluations of web page dynamic behavior.

BRIEF DESCRIPTION OF THE DRAWINGS

FIG. 5 is exemplary event listener data;

FIG. 6 is exemplary event listener data associated with a library that registers a single event listener for an element and uses the bubbling phase to distribute the event to descendants of the element;

FIG. 7 is a string representation of the event listener data of FIG. 5 and an exemplary event listener hash value generated therefrom.

DETAILED DESCRIPTION

Figure 1:
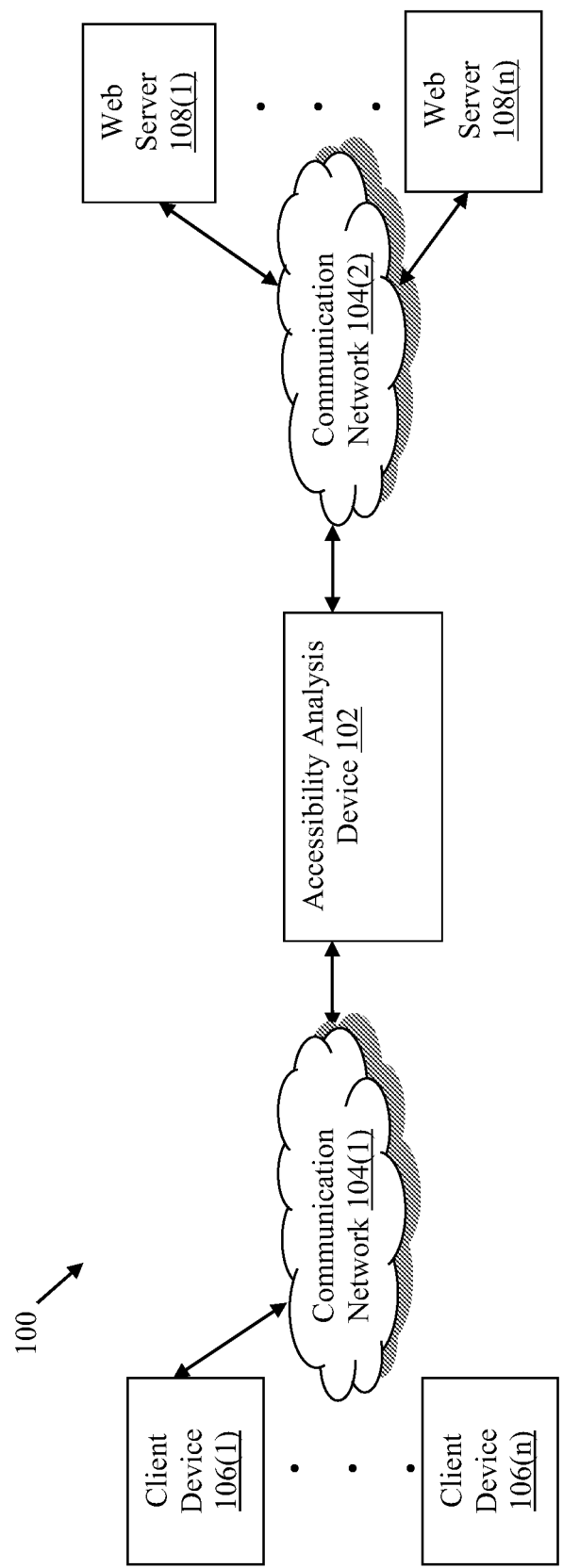
FIG. 1 is a block diagram of an exemplary network environment with an accessibility analysis device.

Referring to FIG. 1, an exemplary network environment 100 is illustrated that includes an accessibility analysis device 102 coupled, via communication network 104(1), to client devices 106(1)-106(n) and, via communication networks 104(2), web servers 108(1)-108(n). The network environment 100 may include other network devices such as one or more routers or switches, for example, which are known in the art and thus will not be described herein. This technology provides a number of advantages including methods, non-transitory computer readable media, and accessibility analysis devices that facilitate accurate identification of recurring accessibility issues with dynamic web page behavior across a web site to more efficiently facilitate web site accessibility evaluations.

In this particular example, the client devices 106(1)-106(n), accessibility analysis device 102, and web servers 108(1)-108(n) are disclosed in FIG. 1 as dedicated hardware devices. However, one or more of the client devices 106(1)-106(n), accessibility analysis device 102, or web servers 108(1)-108(n) can also be implemented in software within one or more other devices in the network environment 100. As one example, the accessibility analysis device 102, as well as any of its components or applications, can be implemented as software executing on one of the web servers 108(1)-108(n), and many other permutations and types of implementations can also be used in other examples.

Figure 2:
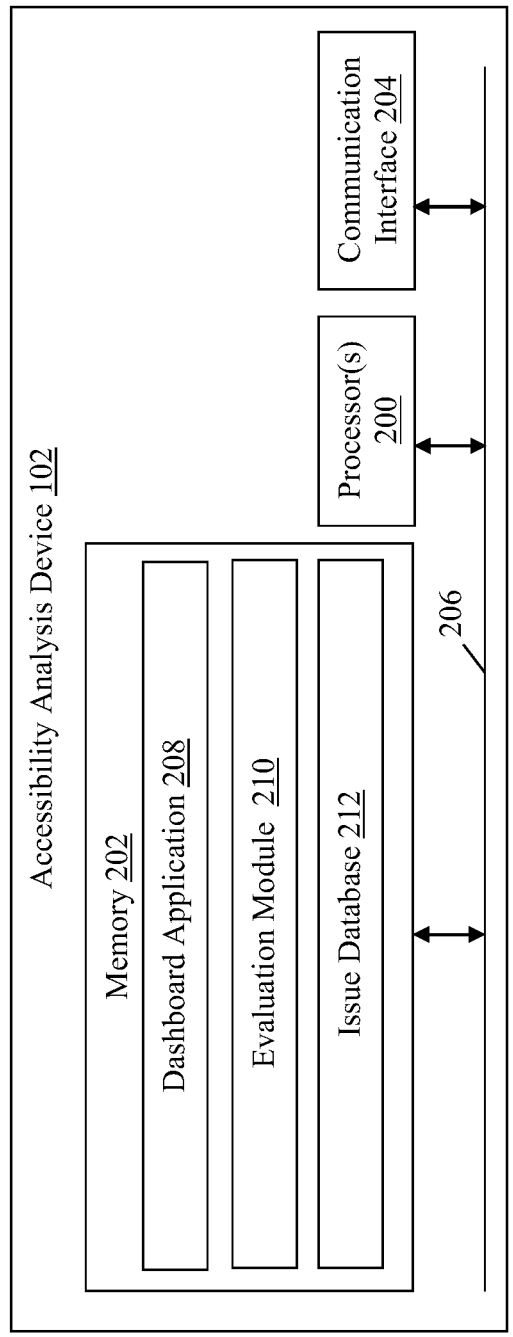
FIG. 2 is a block diagram of an exemplary accessibility analysis device.

Referring to FIGS. 1-2, the accessibility analysis device 102 of the network environment 100 may perform any number of functions, including providing graphical user interfaces (GUIs) to the client devices 106(1)-106(n), and communicating with the web servers 108(1)-108(n) to facilitate web site accessibility evaluations. The accessibility analysis device 102 in this example includes one or more processor(s) 200, a memory 202, and a communication interface 204, which are coupled together by a bus 206, although the accessibility analysis device 102 can include other types or numbers of elements in other configurations.

The processor(s) 200 of the accessibility analysis device 102 may execute programmed instructions stored in the memory 202 of the accessibility analysis device 102 for any number of the functions described and illustrated herein. The processor(s) 200 may include one or more central processing units (CPUs) or general purpose processors with one or more processing cores, for example, although other types of processor(s) can also be used.

The memory 202 of the accessibility analysis device 102 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 200, can be used for the memory 202.

Accordingly, the memory 202 of the accessibility analysis device 102 can store one or more applications that can include computer executable instructions that, when executed by the accessibility analysis device 102, cause the accessibility analysis device 102 to perform actions, such as to transmit, receive, or otherwise process network messages and requests, for example, and to perform other actions described and illustrated below with reference to FIGS. 3-8. The application(s) can be implemented as components of other applications, operating system extensions, and/or plugins, for example.

Further, the application(s) may be operative in a cloud-based computing environment. The application(s) can be executed within or as virtual machine(s) or virtual server(s) that may be managed in a cloud-based computing environment. Also, the application(s), and even the accessibility analysis device 102 itself, may be located in virtual server(s) running in a cloud-based computing environment rather than being tied to one or more specific physical network computing devices. The application(s) may be running in one or more virtual machines (VMs) executing on the accessibility analysis device 102. Additionally, in one or more examples of this technology, virtual machine(s) running on the accessibility analysis device 102 may be managed or supervised by a hypervisor.

In this particular example, the memory 202 of the accessibility analysis device 102 includes a dashboard application 208, an evaluation module 210, and an issue database 212. The dashboard application 208 provides GUI(s) to users of the client devices 14(1)-14(n), which can include web application developers or testers, accessibility issue reviewers, or consumers of accessibility evaluations, for example. The dashboard application 208 in this example receives an indication (e.g., a URL) of a web page or web site and retrieves the associated web page from one of the web servers 108(1)-108(n).

The dashboard application 208 subsequently presents an issue review report via another GUI in response to the request, which includes an indication of accessibility issues identified in the web page and any prior review results that have been retrieved for stored equivalent issues. The dashboard application 208 can also receive via the provided GUI reviews of accessibility issues, which can be stored in the issue database 212 along with additional contextual information related to the reviewed accessibility issues including the signed representation of the element, and associated event handler hash value, associated with the issue, as described and illustrated in more detail below.

The evaluation module 210 is configured to evaluate the web page retrieved by the dashboard application 208 with respect to accessibility issues. The evaluation module 210 can apply rule sets to aspects of the web page source code, for example, based on accessibility guidelines in order to identify potential accessibility issues with dynamic and other content. For example, the evaluation module 210 can be configured to identify potential accessibility issues relating to insufficient contrast, lack of text alternatives for non-text content (e.g., images), or any other issue that may impact the usability or accessibility of the web page.

In this particular example, the evaluation module 210 is further configured to generate and sign representations for event listeners that can have associated classifications (or classifications of the associated event handlers) as well as web page elements associated with the identified dynamic accessibility issues. The evaluation module 210 then uses the signed representations and contents of the issue database 212 to retrieve stored prior reviews for accessibility issues associated with equivalent dynamic behavior for corresponding dynamic web page code The stored prior reviews are provided to the dashboard application 208 to reduce the manual review required for an evaluator of the issue report output by the dashboard application 208. Using the signed representations and issue database 212, the equivalency of the prior accessibility issues and associated review are more accurately identified. The operation of the evaluation module 210 is described and illustrated in more detail later with reference to FIGS. 3-8.

The issue database 212 stores signed representations (e.g., hash values) of elements having associated accessibility issues relating to dynamic web page behavior and for which those accessibility issues have been previously identified by the evaluation module 210 and reviewed by a user. Accordingly, the issue database 212 advantageously facilitates the identification of equivalent dynamic content and the corresponding accessibility issues and the associated reviews. With the accurate identification of corresponding accessibility issues with dynamic behavior across different web pages of a same web site, the issue report can be populated by the dashboard application 208 with prior reviews to improve the efficiency of the web site accessibility evaluation.

The communication interface 204 of the accessibility analysis device 102 operatively couples and communicates between the accessibility analysis device 102, client devices 106(1)-106(n), and web servers 108(1)-108(n), which are coupled together at least in part by the communication networks 104(1) and 104(2), although other types or numbers of communication networks or systems with other types or numbers of connections or configurations to other devices or elements can also be used.

By way of example only, the communication network 104(1) and 104(2) can include local area network(s) (LAN(s)) or wide area network(s) (WAN(s)), and can use TCP/IP over Ethernet and industry-standard protocols, although other types or numbers of protocols or communication networks can be used. The communication networks 104(1) and 104(2) in this example can employ any suitable interface mechanisms and network communication technologies including, for example, Ethernet-based Packet Data Networks (PDNs).

While the accessibility analysis device 102 is illustrated in this example as including a single device, the accessibility analysis device 102 in other examples can include a plurality of devices each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the accessibility analysis device 102. Additionally, one or more of the devices that together comprise the accessibility analysis device 102 in other examples can be standalone devices or integrated with one or more other devices or apparatuses.

Each of the client devices 106(1)-106(n) of the network environment 100 in this example includes any type of computing device that can exchange network data, such as mobile, desktop, laptop, or tablet computing devices, virtual machines (including cloud-based computers), or the like. Each of the client devices 106(1)-106(n) in this example includes a processor, a memory, and a communication interface, which are coupled together by a bus or other communication link (not illustrated), although other numbers or types of components could also be used.

Each of the client devices 106(1)-106(n) may run interface applications, such as standard web browsers or standalone client applications, which may provide an interface to communicate with the accessibility analysis device 102 via the communication network 104(1). Each of the client devices 106(1)-106(n) may further include a display device, such as a display screen or touchscreen, or an input device, such as a keyboard or mouse, for example (not illustrated).

Each of the web servers 108(1)-108(n) in this example includes one or more processors, a memory, and a communication interface, which are coupled together by a bus or other communication link, although other numbers and types of network devices could be used. The web servers 108(1)-108(n) in this example process requests received from the accessibility analysis device 102 related to hosted web pages via the communication network 104(2) according to the HTTP-based application RFC protocol, for example. Various applications may be operating on the web servers 108(1)-108(n) and transmitting data (e.g., files or web pages) to the accessibility analysis device 102. The web servers 108(1)-108(n) may be hardware or software or may represent a system with multiple servers in a pool, which may include internal or external networks.

Although the web servers 108(1)-108(n) are illustrated as single devices, one or more actions of each of the web servers 108(1)-108(n) may be distributed across one or more distinct network computing devices that together comprise one or more of the web servers 108(1)-108(n). Moreover, the web servers 108(1)-108(n) are not limited to a particular configuration. Thus, the web servers 108(1)-108(n) may contain a plurality of network computing devices that operate using a master/slave approach, whereby one of the network computing devices of the web servers 108(1)-108(n) operate to manage and/or otherwise coordinate operations of the other network computing devices. The web servers 108(1)-108(n) may operate as a plurality of network computing devices within a cluster architecture, a peer-to-peer architecture, virtual machines, or within a cloud architecture, for example.

Although the exemplary network environment 100 with the client devices 106(1)-106(n), accessibility analysis device 102, web servers 108(1)-108(n), and communication network 104(1) and 104(2) are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network environment 100, such as the client devices 106(1)-106(n), accessibility analysis device 102, or web servers 108(1)-108(n), for example, may be configured to operate as virtual instances on the same physical machine. In other words, one or more of the client devices 106(1)-106(n), accessibility analysis device 102, or web servers 108(1)-108(n) may operate on the same physical device rather than as separate devices communicating through communication network 104(1) or 104(2). Additionally, there may be more or fewer client devices, accessibility analysis devices, or web servers than illustrated in FIG. 1.

The examples of this technology may also be embodied as one or more non-transitory computer readable media having instructions stored thereon, such as in the memory 202, for one or more aspects of the present technology, as described and illustrated by way of the examples herein. The instructions in some examples include executable code that, when executed by one or more processors, such as the processor(s) 200, cause the processors to carry out steps necessary to implement the methods of the examples of this technology that are described and illustrated herein.

Figure 3:
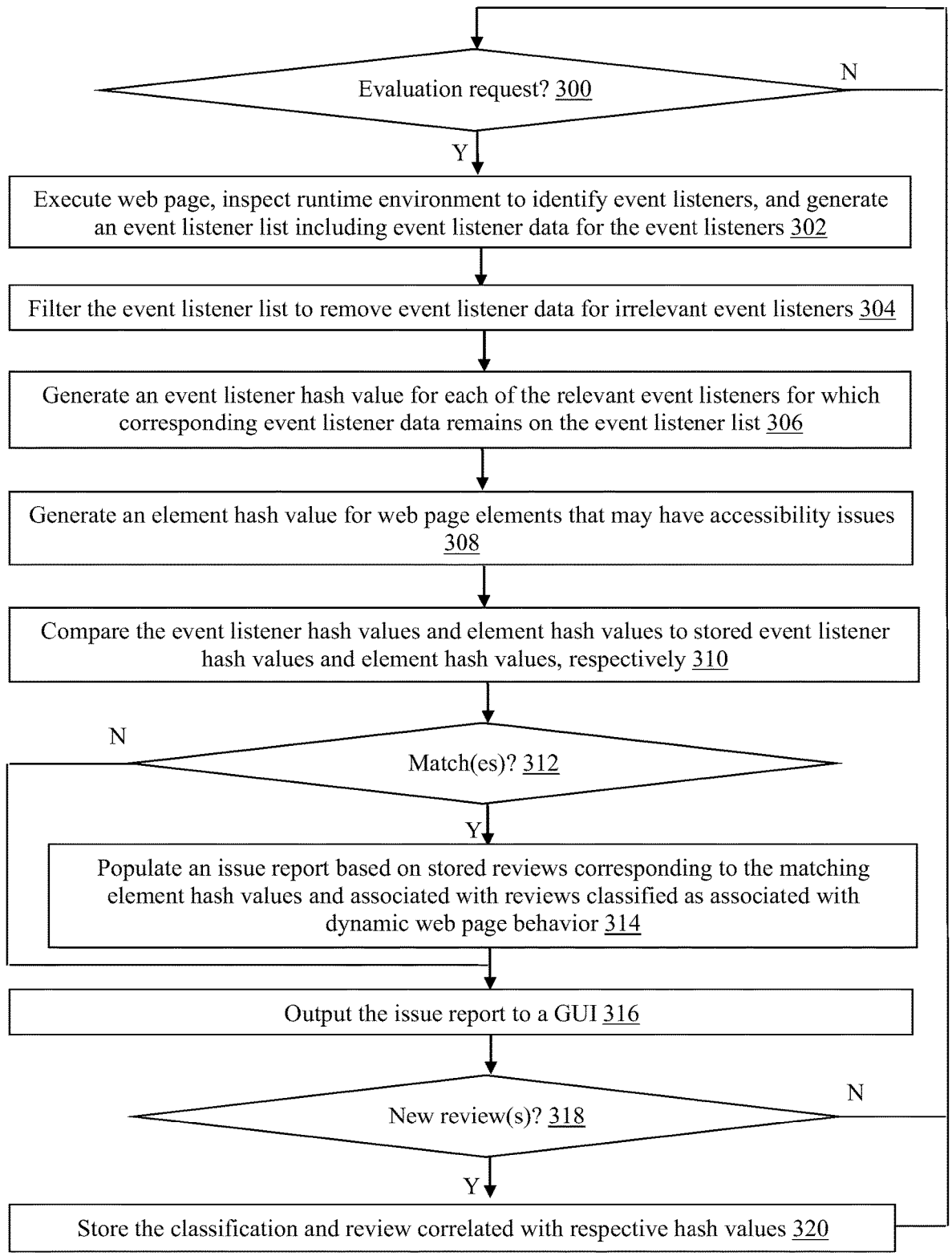
FIG. 3 is a flowchart of an exemplary method for identifying recurring accessibility issues with dynamic behavior across a web site.

Referring to FIG. 3, a flowchart of an exemplary method for identifying recurring accessibility issues with dynamic behavior across a web site is illustrated. In step 300 in this example, the accessibility analysis device 102 determines whether an accessibility evaluation request has been received, such as from one of the client devices 106(1)-106(n), for example. The request can be received via a GUI provided to one of the client devices 106(1)-106(n) and can include an indication of a particular web page URL, such as a URL of a home page of a web site including a plurality of web pages to be evaluated for accessibility issues. If the accessibility analysis device 102 determines that an evaluation request has not been received, then the accessibility analysis device 102 returns to step 300 and effectively waits to receive an evaluation request in this example. However, if the accessibility analysis device 102 determines an evaluation request has been received, then the Yes branch is taken to step 302.

In step 302, the accessibility analysis device 102 retrieves a web page from one of the web servers 108(1)-108(n) based on the URL extracted from the evaluation request. The accessibility analysis device 102 then executes the web page, identifies active event listeners from a runtime environment of the executed web page (e.g., a JavaScript runtime environment), and retrieves source code of the web page corresponding to the identified event listeners. The event listeners can be identified based on a comparison with known syntax or format (e.g., method(s)) configured to implement an event listener. For example, the addEventListener JavaScript method can be used to add event listeners on any Hypertext Markup Language (HTML) Document Object Model (DOM) object, such as HTML elements.

The accessibility analysis device 102 collects the identified event listeners along with event listener data, such as into a list or other type of data storage structure. The event listener data in some examples includes an event type of the event for which the event listener is configured to be triggered, attribute(s) of the event listener, a stack trace that originated the event listener, or source code for an event handler that is executed in response to the occurrence of the event that triggered the associated event listener.

The stack trace can be generated by the accessibility analysis device 102 using the getStackTrace JavaScript method, for example. The stack trace is a representation of a chain of function calls established by the event listener when triggered by an event. Each element of the chain is represented by the function name, the script where the function is defined and the row and column where the definition is located. In other examples, other event listener data can be collected and incorporated into the event listener list by the accessibility analysis device 102.

In step 304, the accessibility analysis device 102 filters the event listener list to remove event listener data for event listeners that are irrelevant to the requested accessibility evaluation of the web page. For example, events that are unrelated to user interactions or are only related to tracking may not be relevant to an evaluation of the accessibility of a web page. In some examples, the filtering in step 304 can be based on an event type of an event listener, a comparison of a portion of a stack trace associated with an event listener to a stored code fragment, and/or repeated chain(s) in the stack trace, although other characteristics can also be used as a basis to remove event listeners and associated data from the event listener list.

Figure 4:
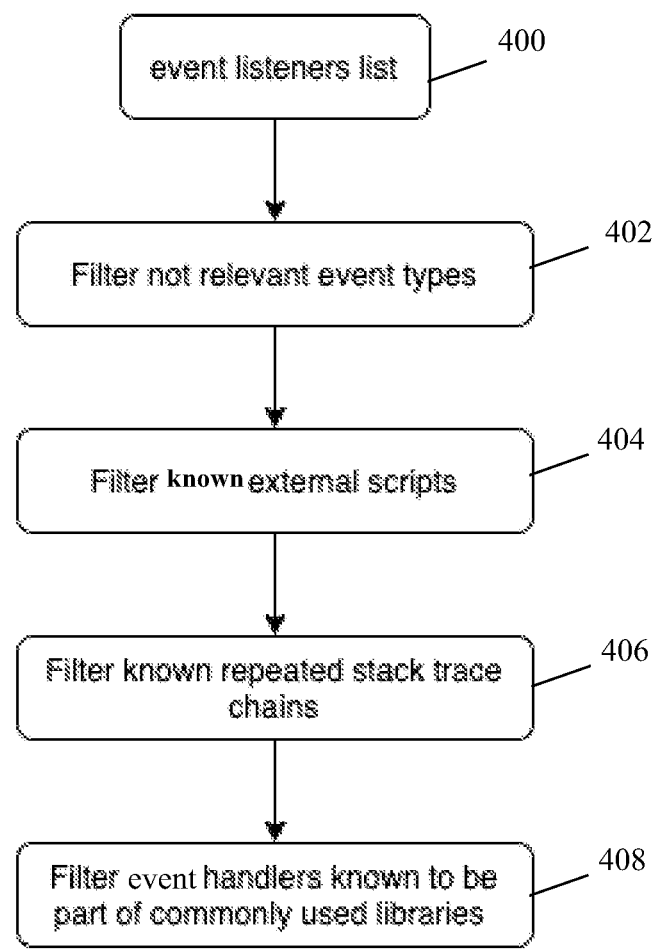
FIG. 4 is a flowchart of an exemplary method for filtering events relevant to accessibility issues.

Referring to FIG. 4, a flowchart of an exemplary method for filtering events relevant to accessibility issues is illustrated. In step 400 in this example, the accessibility analysis device 102 generates the event listener list as explained in more detail above. The event listener list includes an indication of each event listener identified in the web page correlated with the associated event listener data.

In step 402, the accessibility analysis device 102 filters the event listener list based on event type. In step 402, event listener data is removed from the event listener list for event listeners related to events associated with page initialization or other dynamic behavior that is unrelated to user interactions. For example, the event listener DOMContentLoaded is related to web page loading and is therefore not relevant to an evaluation of the accessibility of the web page. Accordingly, the accessibility analysis device 102 can compare the event listener data for the event listeners of the event listener list to a stored list of event listeners known to be associated with a type of event unrelated to user interactions in order to filter the event listener list, although other methods for filtering the event listener list according to irrelevant event types can also be used in other examples.

In step 404, the accessibility analysis device 102 filters the event listener list based on known external scripts that may be associated with external tracking tools. For example, the Google Analytics service offered by Alphabet Inc. of Mountain View, CA has associated scripts that start with the "https://www.google-analytics.com/analytics.js" URL, which is visible in the stack trace generate for an associated event listener. Accordingly, the accessibility analysis device 102 can compare the event listener data (e.g., the stack trace) for event listeners of the event listener list to a stored list of script URLs or URL fragments known to be associated with external tracking tools to filter the event listener list, although other methods for filtering the event listener list based on external tracking tools or scripts can also be used in other examples.

In step 406, the accessibility analysis device 102 filters the event listener list based on known repeated stack trace chains. Some frameworks (e.g., the React™ JavaScript library for building user interfaces offered by Meta Platforms, Inc. of Menlo Park, CA) generate numerous event listeners configured to "standardize" web browser behavior, which is unrelated to any accessibility evaluation, dynamic web page behavior, or user activities or interactions. These event listeners are generated by the same source code fragment and can be identified using the stack trace associated with an event listener in the event listener list.

In one particular example related to React™, the accessibility analysis device 102 can identify the known repeated stack trace chain by determining if a stack trace contains both an Object.t.render function call and Set.forEach method and, if so, determining whether the function call after the Set.forEach method is called by click, mouseover, drag and/or keydown events, in which case the event listener is unrelated to a web page accessibility evaluation and therefore the associated event listener data can be removed from the event listener list. Other methods for filtering the event listener list based on repeated stack trace chains can also be used in other examples.

In step 408, the accessibility analysis device 102 filters the event listener list based on event handlers known to be part of commonly used libraries that are unrelated to web page accessibility evaluation. Some libraries generate event handlers with fixed code that can be recognized and compared to filter the associated event listener data from the event listener list. For example, event handler source code containing "gtm.click" for an event of type "click" for an event listener with a stack trace having Google Tag Manager™ URLs can be identified and filtered from the event listener list. Other methods for filtering the event listener list based on stack traces associated with known libraries unrelated to accessibility can also be used in other examples.

While several examples of filtering the event listener list have been described and illustrated herein with reference to steps 402-408 of FIG. 4, a subset of those examples or additional methods for filtering the event listener list can also be used in other examples. For example, more sophisticated strategies might be implemented to filter event listeners by using parsers or other static analysis tools. By filtering the event listener list, the accessibility analysis device 102 reduces the number of event listeners to be reviewed for accessibility issues, which advantageously results in a more efficient accessibility evaluation.

Referring back to FIG. 3, in step 306, the accessibility analysis device 102 generates an event listener hash value for each of the relevant event listeners for which corresponding event listener data remains on the event listener list. In other words, an event listener hash value is generated for event listeners that were not filtered in step 304. The event listener hash value in some examples can be generated from on a string representation of the event listener data for each of the remaining event listeners. Any hash function can be used including a SHA-512 function, which would result in reduced hash collisions extremely in a relatively limited set of data associated with a web site.

In other examples, the event listener hash function can be generated from a serialization of only a portion of the event listener data or additional relevant attributes extracted from the web page source code, for example. In yet other examples, script URLs in the event listener data can be substituted with the hash value for the content of the script URLs before the event listener hash values are generated, and other methods for generating the event listener hash values can also be used. The event listener hash value is used for classification of associated accessibility issues as relevant or irrelevant to web page accessibility review, as explained in more detail below.

Referring to FIG. 5, exemplary event listener data 500 is illustrated. The event listener data 500 in this example includes attributes about event listener, the event handler, and a stack trace that originated the event listener, which are grouped together or concatenated to form the string representation to which the hash function can be applied to generate the event listener hash value for the event listener associated with the event listener data 500.

Referring to FIG. 6, exemplary event listener data 600 associated with a library that registers a single event listener for an element and uses the bubbling phase to distribute the event to descendants of the element is illustrated. Some libraries (e.g., jQuery offered by the OpenJS Foundation of San Francisco, CA) implement their own event listeners by registering a single event listener for a particular element and use the bubbling phase to then distribute the event to its descendants. In these implementations, an additional "ext" property, such as the property 602 in the event listener data 600, can be collected in the event listener data to which the hash function is applied to generate the event listener hash value. In the jQuery example, the additional property may contain "synthetic" event handlers and/or Cascading Stylesheet (CSS) selectors for specific elements to be triggered in the bubbling phase.

Referring to FIG. 7, a string representation 700 of the event listener data 500 and an exemplary event listener hash value 702 generated therefrom is illustrated. In this particular example, the string representation 700 includes a concatenation of event listener data 500 including an event type, event listener attributes, a stack trace, and an event handler.

A SHA-512 hash function is applied to the concatenated event listener data 500 of the string representation 700 to generate the event listener hash value 702.

Referring back to FIG. 3, in step 308, the accessibility analysis device 102 identifies elements of the web page that may have accessibility issues, and therefore should be presented in an issue report for user review and generates an element hash value for each of those identified web page elements. The accessibility issues in this particular example can relate to dynamic behavior of the web page including any failure of such behavior to comply with one or more published guidelines relating to usability and accessibility of web pages (e.g., the Web Content Accessibility Guidelines 2.0, W3C World Wide Web Consortium Recommendation, Dec. 11, 2008, which is incorporated by reference herein), although other types of accessibility issues can also be identified in step 308 for inclusion in an issue report. The elements identified in step 308 have associated event listeners for which event listener data remains on the event listener list after the filtering performed in step 304 in this example.

The accessibility analysis device 102 also generates an element hash value for each of the web page elements in step 308. In some examples, the element hash value is generated from a string resulting from a concatenation of a CSS hash value of the element and an event handler hash value of the event handler associated with the elements. The event handler hash value is generated in some examples based on an obtained script comprising a declaration of a function corresponding to a function call in event handler source code for the event handlers, as explained in more detail with reference to FIG. 8. Accordingly, a hash function is applied to the CSS source code associated with the element and the hash function (or another hash function) is then applied to a string representation of the resulting hash value and the event handler hash value in order to generate the element hash value. In other examples, the element hash value can be generated in other ways.

Figure 8:
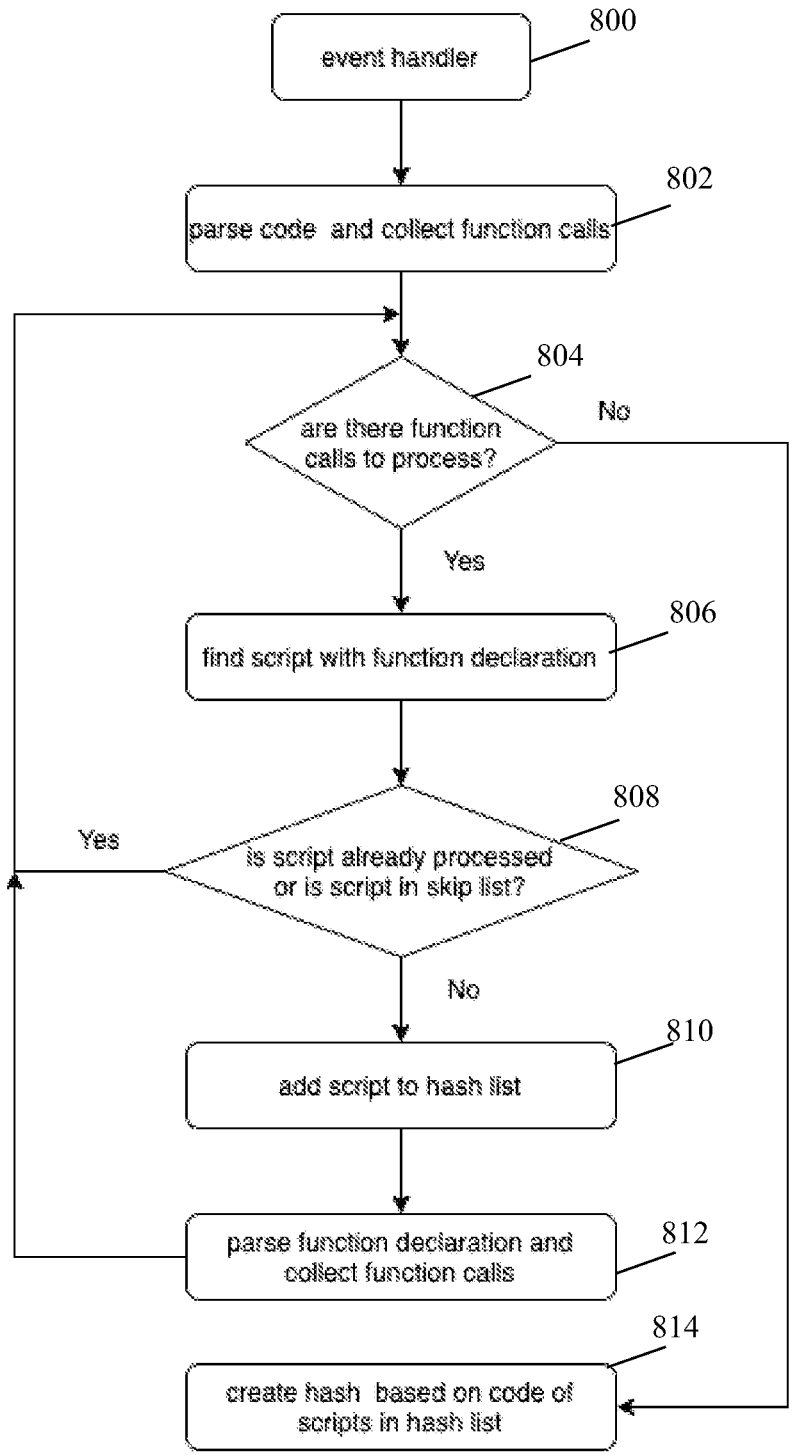
FIG. 8 is a flowchart of an exemplary method for generating an event handler hash value that can be used to generate an element hash value.

Referring to FIG. 8, a flowchart of an exemplary method for generating an event handler hash value that can be used to generate an element hash value is illustrated. In step 800 in this example, the accessibility analysis device 102 extracts the event handler source code from the web page source code or the event listener data included in the event listener list, for example.

In step 802, the accessibility analysis device 102 parses the event handler source code and collects all associated function calls in the body of the event handler source code. Referring back to the event listener data 500 of FIG. 5, the event handler is "function( ){toggleResources( );}" and there is only one function call to "toggleResources( )."

Referring back to FIG. 8, in step 804 in this example, the accessibility analysis device 102 determines whether there are any function calls to process. If the accessibility analysis device 102 determines that there is at least one function call to process, then the Yes branch is taken to step 806.

In step 806, the accessibility analysis device 102 identifies a script that includes a function declaration for the called function. Referring again to FIG. 2, the script "all.js" contains the "toggleResource( )" declaration for the "toggleResources( )" function called by the event handler.

Referring back to FIG. 8, in step 808, the accessibility analysis device 102 determines whether the script has already been processed or is on a skip list, for example. In this example, scripts matching the function call but already processed or that are members of a skip list (e.g., scripts known to be harmless like tracking tools) are not considered. Accordingly, if the accessibility analysis device 102 determines that the script (e.g., all.js in the example of FIG. 2) has already been processed (e.g., in another iteration of FIG. 8 for a different event handler associated with the web page) or is on a skip list, then the Yes branch is taken back to step 804. However, if the accessibility analysis device 102 determines that the script has not already been processed or is not on a skip list, then the No branch is taken to step 810.

In step 810, the accessibility analysis device 102 adds the script to a hash list from which the event handler hash value can be generated. Optionally, the accessibility analysis device 102 can add the script to a script list to which scripts identified in subsequent iterations of step 806 can be compared in step 808 to determine whether the scripts have been processed previously.

In step 812, the accessibility analysis device 102 parses the function declaration in the script and collects any function calls within the function declaration (i.e., in the function declaration body). The accessibility analysis device then proceeds back to step 807

In step 804, the accessibility analysis device 102 again determines whether there are additional function calls to process either based on identification of the function call(s) in step 812 or as collected in step 802. If in this subsequent iteration of step 804 the accessibility analysis device 102 determines that there are no more function calls to process, then the No branch is taken to step 814.

In step 814, the accessibility analysis device 102 generates an event handler hash value for the event handler. In one example, the source code associated with each of the script(s) identified in the hash list generated in step 810 is obtained and concatenated to form a string representation to which a hash function (e.g., SHA-512) is applied to generate the event handler hash value, although other methods for generating the event handler hash value can also be used in other examples.

Referring back to FIG. 3, in step 310, the accessibility analysis device 102 compares the event listener hash values generated in step 306 and the element hash values generated in step 310 to stored event listener hash values and element hash values, respectively. The event listener hash values and/or element hash values could have been stored in the issue database 212 as described and illustrated in detail below with reference to step 320, for example.

As explained below, the event listeners (or corresponding event handlers) can be classified by a user as used for tracking or to change user experience in the web page (i.e., dynamic web page behavior), for example, among other classifications. Some of the classifications (e.g., a tracking classification) will render the event listener and accessibility issue(s) with the associated web page element irrelevant to the accessibility evaluation, and therefore the accessibility analysis device 102 will not include those accessibility issues on the issue report. An accessibility issue with an element is uniquely identified by the element hash value (e.g., as generated in step 310 and/or stored in step 322) and the review performed on the accessibility issue will be valid for another accessibility issue identified with another element of another web page of the same web site or another accessibility evaluation of another version of the same web page, for example.

In step 312, the accessibility analysis device 102 determines whether there is at least one event listener hash values and/or element hash value match based on the comparison in step 312. If the accessibility analysis device 102 determines that there is at least one event listener hash value or element hash value match, then the Yes branch is taken to step 314.

In step 314, the accessibility analysis device 102 populates an issue report based on stored issues and associated reviews corresponding to the matching element hash values. Accordingly, the issue report can include indications of web page elements, their associated accessibility issues, and any prior review of those accessibility issues. However, the accessibility analysis device 102 will not populate the issue report with any of the accessibility issues associated with web page elements associated with an event listener having a matching event listener hash value based on the comparison in step 310 and associated stored classification indicating that the event listener (or event handler corresponding to the event listener) is irrelevant to the accessibility evaluation (e.g., a tracking classification).

Optionally, in examples in which a review is not yet stored for an accessibility issue, the issue report can be populated with an indication that the accessibility issue is without review and/or a recommended fix for the accessibility issue retrieved from a database and correlated with characteristic(s) of the accessibility issue. Subsequent to populating the issue report in 314, or if the accessibility analysis device 102 determines in step 312 that there are no event listener hash values or element hash value matches and the No branch is taken, then the accessibility analysis device 102 proceeds to step 316.

In step 316, the accessibility analysis device 102 the accessibility analysis device 102 outputs the issue report to a GUI provided to the one of the client devices 106(1)-106(n) from which the request received in step 300 was received, for example. The issue report can include the issues and associated reviews incorporated into the issue report in step 314 along with new accessibility issues identified in step 308 and for which a prior review was not stored. The issue report allows a user of the one of the client devices 106(1)-106(n) to visualize the accessibility issues with the web page, obtain recommended fixes, determine how corresponding accessibility issues were previously addressed based on reviews populated in step 314, and/or view generated statistics regarding the accessibility of the web page, for example.

A review can be an indication that the associated accessibility issue was ignored, an indication or description of a fix that was implemented to address the accessibility issue, or any other data or narrative regarding the accessibility issue received via the issue report GUI provided to the one of the client devices 106(1)-106(n), for example. By accurately identifying equivalent event listeners, accessibility issues associated with event listeners previously classified as irrelevant to accessibility and/or dynamic web page behavior can be ignored, resulting in a more succinct issue report and efficient accessibility evaluation. Additionally, by accurately identifying equivalent web page elements, and duplicative accessibility issues, manual review of the issue report can be reduced, and the duplicative accessibility issues can be efficiently addressed based on prior reviews of those accessibility issues.

In step 318, the accessibility analysis device 102 determines whether there are any new reviews of accessibility issues identified in step 308 for which no prior review was stored based on the comparison in step 310 and determination in step 312. If the accessibility analysis device 102 did not populate the issue report based on any accessibility issues for which an associated review was not previously stored, or otherwise based on any accessibility issue not identified based on a prior review, (e.g., the web page is identical to a previously-evaluated web page), then the No branch is taken back to step 300 in this example. However, if the accessibility analysis device 102 determines that at least one new accessibility review is obtained, then the Yes branch is taken from step 318 to step 320.

In step 320, the accessibility analysis device 102 stores, in the issue database 212 and for each of the new accessibility issues identified in step 308 (i.e., accessibility issue for which a match of an element hash value for the web page element associated with the accessibility issue was not found based on the comparison in step 310), an indication of the accessibility issue, the associated obtained new review of the accessibility issue, and the element hash value generated in step 306. As part of the new review(s) of the new accessibility issue(s), the accessibility analysis device 102 can also obtain a classification of the event listener (or the event handler corresponding to the event listener) associated with the web page element associated with the new accessibility issue.

The classification can be obtained from the one of the client devices 106(1)-106(n) on which the interactive issue report is displayed based on an analysis of the code in the stack trace or in the event handler, naming conventions for function calls or variables, and/or an analysis of the real behavior of the web page (or a component of the web page), for example. The storage in step 320, facilitates the match determination in a subsequent iteration of step 312 for another web page with duplicative event listeners and/or accessibility issues, which allows the accessibility analysis device 102 to ignore accessibility issues associated with web page element associated with event listeners unrelated to dynamic web page behavior and to populate the issue report with prior reviews of equivalent accessibility issues. Subsequent to step 320, the accessibility analysis device 102 proceeds back to step 300 in this example. In other examples, one or more of steps 300-620 can be performed in parallel and/or in a different order.

As described and illustrated by way of the examples herein, this technology more accurately and efficiently analyzes web page accessibility issues with dynamic web page behavior across a web site by reducing or eliminating duplicative accessibility evaluations. This technology more efficiently performs web page accessibility evaluations by filtering events that are irrelevant to dynamic web page behavior and the associated accessibility evaluation being performed. The filtering can be based on an automated evaluation of event listener data or comparison with a prior classification of the event listener.

Moreover, with this technology, prior reviews of accessibility issues can advantageously be used to populate an issue report, without requiring manual review of the accessibility issues, for equivalent web pages portions or elements. Accordingly, this technology advantageously identifies and outputs prior reviews (instead of default recommendations, for example) for accessibility issues present in web page elements associated with dynamic web page behavior, thereby reducing the computing resources required to conduct web site accessibility evaluations while improving the accuracy of the result of such evaluations.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for evaluating web site accessibility, the method implemented by one or more accessibility analysis devices and comprising:
generating an event listener hash value for each of a plurality of event listeners identified in a runtime environment for a web page in response to a request for an accessibility review of the web page, wherein the event listener hash values are generated at least in part from event listener data extracted from source code of the web page corresponding to the identified event listeners;
determining that a first subset of the plurality of event listeners are irrelevant to the accessibility review based on a classification of the first subset of the plurality of event listeners, wherein the classification is identified based on a comparison of the event listener hash values to stored event listener hash values;
generating an element hash value for each of a plurality of elements of the web page associated with a second subset of the plurality of event listeners determined to be relevant to the accessibility review, wherein each of the plurality of elements is associated with one of a plurality of accessibility issues; and
generating and outputting to a client device for display an interactive issue report including a review for each of a third subset of the plurality of accessibility issues retrieved based on a comparison of the generated element hash values to stored element hash values, wherein the retrieved reviews are correlated in the interactive issue report with the third subset of the plurality of accessibility issues.

2. The method of claim 1, wherein the event listener data comprises one or more of an event type, one or more event listener attributes, a stack trace, or event handler source code and the method further comprises generating the event listener hash value for one of the plurality of event listeners from a string representation of a portion of the event listener data corresponding to the one of the plurality of event listeners.

3. The method of claim 1, further comprising generating the element hash value for one of the plurality of elements from a string resulting from a concatenation of a Cascading Style Sheet (CSS) hash value of the one of the plurality of elements and an event handler hash value of an event handler associated with the one of the plurality of elements.

4. The method of claim 3, further comprising generating the event handler hash value based on an obtained script comprising a declaration of a function corresponding to a function call in event handler source code for the event handler.

5. The method of claim 1, further comprising determining that the first subset of the plurality of event listeners are irrelevant to the accessibility review further based on one or more of an event type of each of the first subset of the plurality of event listeners, a comparison of a portion of a stack trace associated with each of the first subset of the plurality of event listeners to a stored code fragment, or one or more repeated chains in the stack trace.

6. The method of claim 1, further comprising, subsequent to generating and outputting the issue report storing another review of one of the plurality of accessibility issues as associated with another one of the generated element hash values.

7. An accessibility analysis device, comprising memory comprising programmed instructions stored thereon and one or more processors configured to execute the stored programmed instructions to:
generate an event listener hash value for each of a plurality of event listeners identified in a runtime environment for a web page in response to a request for an accessibility review of the web page, wherein the event listener hash values are generated at least in part from event listener data extracted from source code of the web page corresponding to the identified event listeners;
determine that a first subset of the plurality of event listeners are irrelevant to the accessibility review based on a classification of the first subset of the plurality of event listeners, wherein the classification is identified based on a comparison of the event listener hash values to stored event listener hash values;
generate an element hash value for each of a plurality of elements of the web page associated with a second subset of the plurality of event listeners determined to be relevant to the accessibility review, wherein each of the plurality of elements is associated with one of a plurality of accessibility issues; and
generate and output to a client device for display an interactive issue report including a review for each of a third subset of the plurality of accessibility issues retrieved based on a comparison of the generated element hash values to stored element hash values, wherein the retrieved reviews are correlated in the interactive issue report with the third subset of the plurality of accessibility issues.

8. The accessibility analysis device of claim 7, wherein the event listener data comprises one or more of an event type, one or more event listener attributes, a stack trace, or event handler source code and the one or more processors are further configured to execute the stored programmed instructions to generate the event listener hash value for one of the plurality of event listeners from a string representation of a portion of the event listener data corresponding to the one of the plurality of event listeners.

9. The accessibility analysis device of claim 7, wherein the one or more processors are further configured to execute the stored programmed instructions to generate the element hash value for one of the plurality of elements from a string resulting from a concatenation of a Cascading Style Sheet (CSS) hash value of the one of the plurality of elements and an event handler hash value of an event handler associated with the one of the plurality of elements.

10. The accessibility analysis device of claim 9, wherein the one or more processors are further configured to execute the stored programmed instructions to generate the event handler hash value based on an obtained script comprising a declaration of a function corresponding to a function call in event handler source code for the event handler.

11. The accessibility analysis device of claim 7, wherein the one or more processors are further configured to execute the stored programmed instructions to determine that the first subset of the plurality of event listeners are irrelevant to the accessibility review further based on one or more of an event type of each of the first subset of the plurality of event listeners, a comparison of a portion of a stack trace associated with each of the first subset of the plurality of event listeners to a stored code fragment, or one or more repeated chains in the stack trace.

12. The accessibility analysis device of claim 7, wherein the one or more processors are further configured to execute the stored programmed instructions to, subsequent to generating and outputting the issue report store another review of one of the plurality of accessibility issues as associated with another one of the generated element hash values.

13. A non-transitory computer readable medium having stored thereon instructions for evaluating web site accessibility comprising executable code which when executed by one or more processors, causes the processors to:
   generate an event listener hash value for each of a plurality of event listeners identified in a runtime environment for a web page in response to a request for an accessibility review of the web page, wherein the event listener hash values are generated at least in part from event listener data extracted from source code of the web page corresponding to the identified event listeners;
   determine that a first subset of the plurality of event listeners are irrelevant to the accessibility review based on a classification of the first subset of the plurality of event listeners, wherein the classification is identified based on a comparison of the event listener hash values to stored event listener hash values;
   generate an element hash value for each of a plurality of elements of the web page associated with a second subset of the plurality of event listeners determined to be relevant to the accessibility review, wherein each of the plurality of elements is associated with one of a plurality of accessibility issues; and
   generate and output to a client device for display an interactive issue report including a review for each of a third subset of the plurality of accessibility issues retrieved based on a comparison of the generated element hash values to stored element hash values, wherein the retrieved reviews are correlated in the interactive issue report with the third subset of the plurality of accessibility issues.

14. The non-transitory computer readable medium of claim 13, wherein the event listener data comprises one or more of an event type, one or more event listener attributes, a stack trace, or event handler source code and the executable code when executed by the one or more processors further causes the one or more processors to generate the event listener hash value for one of the plurality of event listeners from a string representation of a portion of the event listener data corresponding to the one of the plurality of event listeners.

15. The non-transitory computer readable medium of claim 13, wherein the executable code when executed by the one or more processors further causes the one or more processors to generate the element hash value for one of the plurality of elements from a string resulting from a concatenation of a Cascading Style Sheet (CSS) hash value of the one of the plurality of elements and an event handler hash value of an event handler associated with the one of the plurality of elements.

16. The non-transitory computer readable medium of claim 15, wherein the executable code when executed by the one or more processors further causes the one or more processors to generate the event handler hash value based on an obtained script comprising a declaration of a function corresponding to a function call in event handler source code for the event handler.

17. The non-transitory computer readable medium of claim 13, wherein the executable code when executed by the one or more processors further causes the one or more processors to determine that the first subset of the plurality of event listeners are irrelevant to the accessibility review further based on one or more of an event type of each of the first subset of the plurality of event listeners, a comparison of a portion of a stack trace associated with each of the first subset of the plurality of event listeners to a stored code fragment, or one or more repeated chains in the stack trace.

18. The non-transitory computer readable medium of claim 13, wherein the executable code when executed by the one or more processors further causes the one or more processors to, subsequent to generating and outputting the issue report store another review of one of the plurality of accessibility issues as associated with another one of the generated element hash values.

* * * * *